Nov. 17, 1925.

W. E. GOSSLING

POST AND COVER SEAL

Filed July 30, 1920

1,562,159

Inventor:
Walter E. Gossling,
by Byrnes Townsend & Brickenstein,
Attorneys.

Patented Nov. 17, 1925.

1,562,159

UNITED STATES PATENT OFFICE.

WALTER E. GOSSLING, OF NEW YORK, N. Y., ASSIGNOR TO THE PREST-O-LITE COMPANY, INC., A CORPORATION OF NEW YORK.

POST AND COVER SEAL.

Application filed July 30, 1920. Serial No. 400,011.

*To all whom it may concern:*

Be it known that I, WALTER E. GOSSLING, a citizen of the United States, residing at New York, in the county of New York and State of New York, have invented certain new and useful Improvements in Post and Cover Seals, of which the following is a specification.

This invention relates to an improved post and cover seal, and particularly to a method of and means for clamping a storage battery terminal post in an opening in the cover of a cell and for sealing the joint between such opening and post to prevent the leakage of electrolyte and gas from said cell, and also to prevent evaporation of the electrolyte, but it will be understood that the invention may be applied to advantage in other structures where a post or similar rod-like member is to be assembled and sealed in the opening in a cover or similar plate-like member.

The principal object of this invention is to provide a simple and efficient clamping and sealing means adapted especially for securing a terminal post in the opening in the cell cover of a storage battery and for sealing such post in said opening.

Generally speaking, the method and means employed for securing and sealing the terminal post in the opening in the cover through which it projects, takes advantage of the fact that the cover, or at least a portion thereof which surrounds the opening in the cover, is of elastic or compressible insulating material and may by suitable means be forced inwardly or contracted into clamping and sealing relation to the terminal post in said opening.

Figure 1:
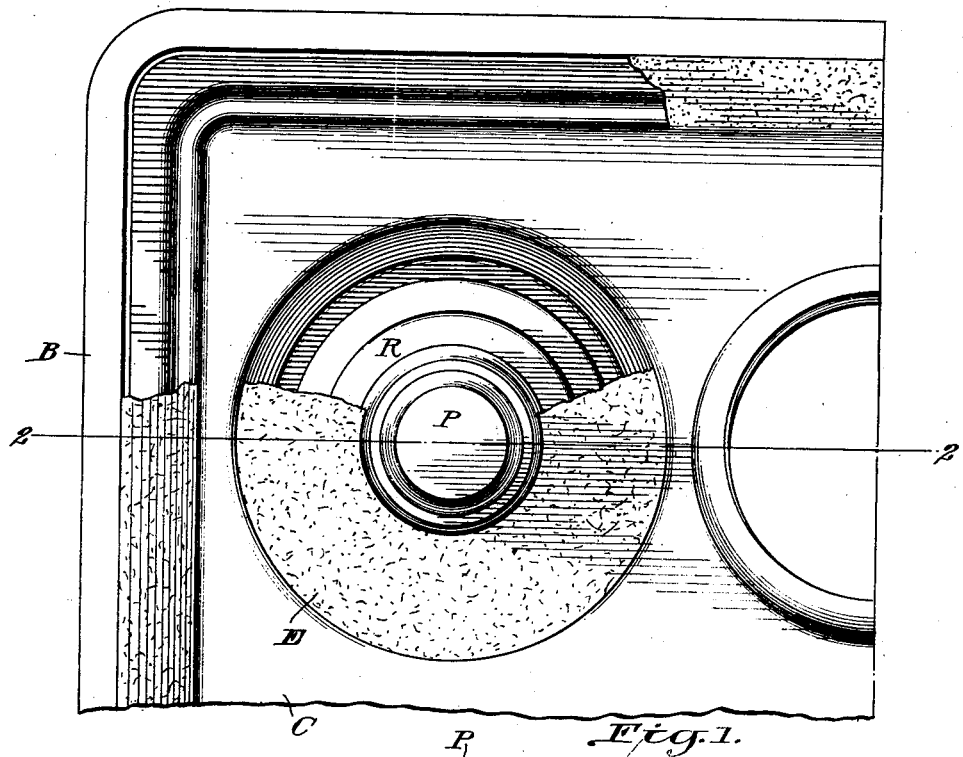
Figure 2:
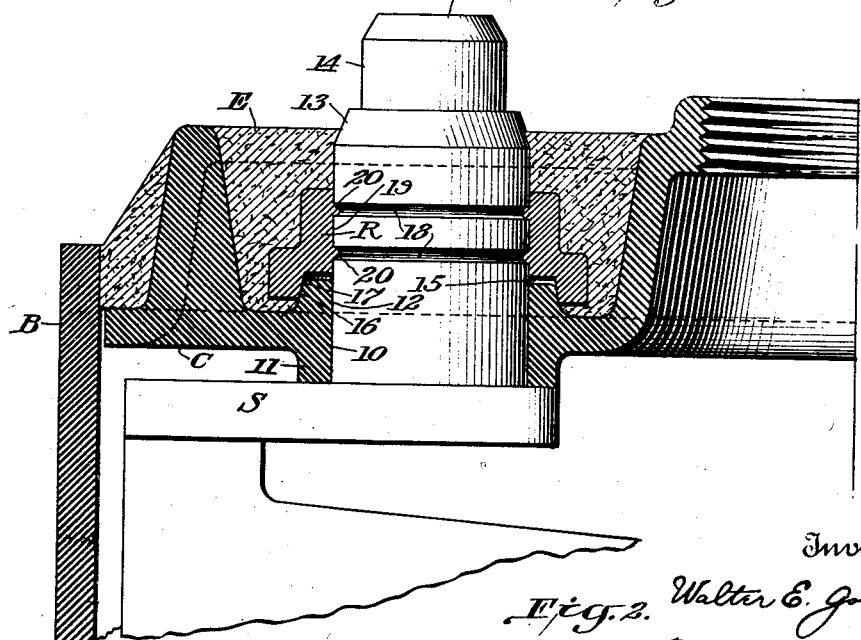

The above and other objects and the novel features of my invention will be apparent from the following description taken in connection with the drawing, in which Figs. 1 and 2 are, respectively, a plan view and a section on line 2—2 of Fig. 1, of a portion of a storage battery cell, illustrating the application of my improved post and cover clamp and seal thereto.

Referring to the drawings, B designates the container of a storage battery of usual or any desirable type. In order to retain the electrolyte in container B and prevent evaporation thereof, and also to exclude foreign materials from the electrolyte, a cover C is employed and sealed into the upper end of the container B. The cell B contains the usual elements or plates and separators of a storage battery, which are rendered readily connective to the external circuit of a battery by means of terminal posts, such as the terminal post P which is of suitable lead alloy or other non-corrodible material. The terminal post P is connected to the storage battery elements or plates within the cell by means of a strap S of the usual or any preferred construction and has a portion projecting from the inside to the outside of the cell through an opening 10 in the cover plate C, the terminal post fitting snugly within the opening 10.

In order to prevent leakage of electrolyte and gas, and evaporation of electrolyte past the joint between the terminal post and the opening 10, the improved sealing means embodying the present invention is employed. The invention takes advantage of the fact that the cover plate C, or at least a portion thereof adjacent the opening 10, may be formed of suitable semi-plastic or compressible material that will flow or may be pressed inwardly against the terminal post and into sealing relation therewith by the application of inward pressure to a portion of the cover plate adjacent the opening 10. Various methods of obtaining a seal by this simple and advantageous compression method may be adopted, the one herein disclosed being a very desirable one. In the arrangement illustrated, the cover plate C is entirely formed or molded of a suitably normally relatively semi-plastic, elastic or compressible and yieldable material such as hard rubber. Surrounding opening 10, the cover C is provided with two annular integral flanges or bosses 11 and 12, the flange 11 projecting inwardly and forming an abutment for engagement by the upper side of the strap S on the terminal post, and the flange or boss 12 projecting upwardly from the plate and having the inner wall thereof snugly fitting the terminal post.

In the present arrangement, the seal between the cover and the terminal post is effected by exerting pressure inwardly against the flange or boss 12 by suitable means, whereby the inner wall of the flange 12 and the adjoining portion of the opening 10 in the cover C are contracted into intimate sealing relation to the adjoining portion of the terminal post P. Suitable means may be employed for applying inward pressure to the boss or flange 12, the simple and effective means illustrated comprising a cam ring R of suitable non-corrodible metal which is adapted to be snugly fitted on to the upper end of the terminal post P by expanding a ring of normally smaller dimensions than the sealing surface of the terminal post over a tapering portion 13 just below the cylindrical conductor engaging portion 14 of the terminal post. This expansion, though a desirable feature for the purpose of providing a sealing fit between the ring and the terminal post, is not essential to obtaining the advantageous results of the main feature of the invention.

The ring R is adjustable axially of the post P and the opening in the cover C and its lower end is provided with an annular recess 15 which is adapted to fit over the upper end of the boss or flange 12. The recess 15 has an inclined wall 16 which forms a downwardly flaring camming surface adapted to engage the outer surface of the flange 12 and exert inward radial pressure against the latter to force the inner wall thereof against the surface of the terminal post P. The upper outer edge of the flange 12 is desirably rounded off, as at 17, or otherwise beveled so that the inward pressure exerted by the cam ring R may be readily applied. It will be apparent that the farther down the cam ring R is forced, the tighter the boss 12 will be pressed against the post P, whereby the wall of the opening in the cover is tightly and frictionally clamped against the post to provide a secure clamping arrangement for holding the post in place and a liquid and air-tight seal. The terminal post P and parts co-operating therewith may be of rectangular or other section than the circular section herein disclosed. The terminal post P is desirably but not necessarily provided with recesses or parallel grooves 18, 18, in that part thereof projecting above the flange 12 to receive metal which, because of its compressed condition, will flow into these grooves from the inner wall 19 of the cam ring R, as at 20, 20, and interlock the ring and post, such interlocking portion of the ring being desirably of noncorrodible and relatively semi-plastic metal such as antimony-lead alloy. Pressure may be exerted in any suitable manner against the exterior of the ring R to force it into place on the terminal post and cover. After the ring is in position, sealing compound E of a suitable composition may be poured over the cover C and around and over the ring and adjoining parts of the terminal post P and flange 12, thus providing a perfect acid-proof post and cover seal.

While the improved post and cover clamp and seal has been described in detail, it is to be understood that various features thereof may be modified without departing from the spirit of the invention or sacrificing any of the advantages thereof.

I claim:

1. In a storage battery, the combination of a cell; a cover therefor having an opening therethrough and a part adjacent said opening comprising contractible insulating material; suitable electrodes in said cell; a terminal post connected to said electrodes and projecting through said opening, said post having means outside said cell whereby a conductor may be secured thereto; and means for contracting such contractible cover part toward said post.

2. In a post and cover seal for storage batteries, in combination, a cell cover comprising an integral contractible portion having an opening therethrough, a storage battery terminal post projecting through said opening, and means for contracting said integral portion of said cover into sealing engagement with said post.

3. In a post and cover seal for storage batteries, in combination, a cell cover of insulating material having an opening therethrough and a flange integral with said cover and surrounding said opening, a storage battery terminal post projecting through and above said opening and flange, and a ring fitting said post and cooperating with said flange to contract the same into sealing engagement with said post.

4. A post and cover seal for storage batteries comprising, in combination, a cover of hard rubber or similar insulating material having an opening therein and an integral flange surrounding said opening, a terminal post projecting through said opening, and means interlocked with said post below the upper end thereof and contracting said flange into sealing relation with said post.

5. A post and cover seal for storage batteries comprising, in combination, a cell cover of compressible insulating material having an opening therethrough, a storage battery terminal post fitting therein, integral inclined means on the upper side of said cover adjacent said opening, and means adapted and arranged to cooperate with such inclined means to force a portion of said cover into sealing engagement with a terminal post disposed in said opening.

6. The invention as claimed in claim 5, in which said inclined means comprises a portion of an integral flange on the upper side of said cover and surrounding said opening, and such forcing means comprises a cam ring having an inclined surface cooperating with the inclined portion of said flange.

7. The invention as claimed in claim 6, in which said cam ring is adjustable axially of said post, has a part that is normally of smaller diameter than said post and comprises metal that will flow into recess means in the terminal post above the opening in the cell cover.

8. A post and cover seal for storage batteries comprising, in combination, a cell cover having an opening therethrough adapted to fit a storage battery terminal post, compressible means on the upper side of said cover adjacent said opening, adjustable means cooperating with said compressible means and adapted to force the latter inwardly into sealing engagement with a terminal post in said opening, and sealing material surrounding such compressible means, adjustable means and the joints between the same and the post and cover.

9. The method of sealing a storage battery terminal post in the opening in the cell cover through which it projects, which comprises contracting an integral portion of the cell cover into sealing relation to the terminal post.

10. The method of sealing a storage battery terminal post in the opening in the cell cover through which it projects, which comprises providing an integral flange of compressible material on the cover adjacent said opening, and forcing such flange inwardly against a terminal post in said opening.

11. The method of sealing a storage battery terminal post in an opening in a cell cover through which it projects, which comprises applying contracting means to said cover to contract an integral portion of the cover and interlocking such contracting means and the part of said post above said cover.

12. The method of sealing a storage battery terminal post in an opening in a cell cover through which it projects, such post being recessed in the part thereof above said cover, which comprises applying contracting means to said cover to contract an integral portion of the cover inwardly into sealing relation to the terminal post, and interlocking such contracting means and the recessed part of said post above said cover.

13. In joint sealing means of the character described, the combination of a cover or similar plate-like member having an opening therein and an integral flange surrounding said opening, a recessed post or similar rod-like member projecting through said opening and having the recessed portion thereof disposed above said flange, and a ring interlocked with said recessed portion and contracting said flange.

14. A storage battery post and cover seal comprising in combination, a cover of hard rubber or similar material having an opening therethrough, a terminal post having means bearing against the inner side of said cover and projecting through said opening above the upper side of said cover, and a ring interlocked with said post below its upper end and contracting an integral part of said cover adjacent said opening inwardly into sealing contact with said post.

I testimony whereof, I affix my signature.

WALTER E. GOSSLING.